No. 842,880. PATENTED FEB. 5, 1907.
A. J. GARRISON & A. A. BOSSERMAN.
NUT LOCK.
APPLICATION FILED MAY 2, 1906.
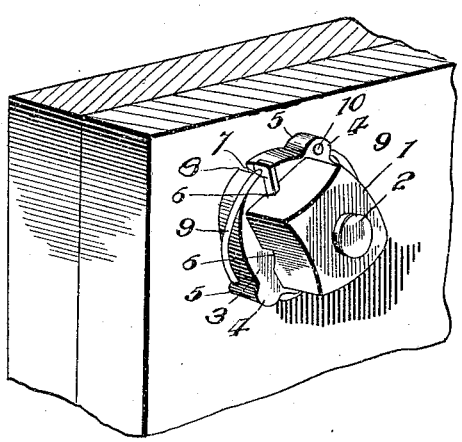
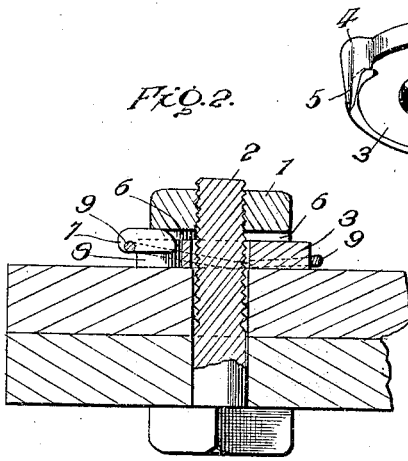
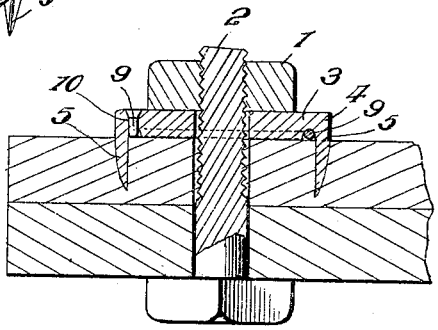
Inventors
A.J. Garrison,
A.A. Bosserman

UNITED STATES PATENT OFFICE.

AWULIUS J. GARRISON AND ARCH A. BOSSERMAN, OF GREENVILLE, VIRGINIA.

NUT-LOCK.

No. 842,880.  Specification of Letters Patent.  Patented Feb. 5, 1907.

Application filed May 2, 1906. Serial No. 314,897.

*To all whom it may concern:*

Be it known that we, AWULIUS J. GARRISON and ARCH A. BOSSERMAN, citizens of the United States, residing at Greenville, in the county of Augusta and State of Virginia, have invented certain new and useful Improvements in Nut-Locks, of which the following is a specification.

This invention consists of a new and novel form of nut-lock.

For a full understanding of the invention and the merits thereof and also to acquire a knowledge of the details of construction of the means for effecting the result reference is to be had to the following description and accompanying drawings, in which—

Figure 1 is a perspective view of a nut-lock embodying the invention. Fig. 2 is a vertical sectional view showing more clearly the mounting of the spring-actuated pawl. Fig. 3 is a sectional view bringing out clearly the manner of attaching the spring which carries the pawl to the washer. Fig. 4 is an under side perspective view of the washer.

Corresponding and like parts are referred to in the following description and indicated in all the views of the drawings by the same reference characters.

The invention relates to that type of nut-locks utilizing a washer having a spring-pawl arranged to engage the nut to prevent the unscrewing movement of the latter. The washer is provided with suitable means for preventing rotation, thereby avoiding liability of displacement of the nut without manual operation of the parts of the locking device.

In the drawings the numeral 1 designates the nut, the numeral 2 the bolt, and the numeral 3 the washer between the nut 1 and the work. The washer is of peculiar form, having short extensions 4 at its peripheral portion, the latter being formed with integral downwardly-extending projections 5. The projections 5 are preferably pointed and adapted to embed themselves in the work in the part against which the washer is forced, thus preventing rotation of the washer when the invention is in actual use. The nut 1 is provided upon its under side and near the side edges thereof with a number of locking grooves or recesses 6 to receive a locking-pawl 7, applied to the washer 3.

The pawl 7 consists of a small plate arranged for movement in a radial slot 8, extending from the peripheral portion of the washer, said pawl 7 being attached to one end of a spring 9. The spring 9 is of somewhat circular form, having one end thereof upturned and passed into a vertical opening 10 in the washer 3. The opening 10 is located adjacent to one of the extensions 4, and after the upturned portion of the spring 9 has been passed through the opening 10 the upper extremity of the upturned portion is headed to prevent displacement of the spring from the washer. The spring 9 curves and passes through a small groove in the under side of the extension 4 opposite that adjacent to the upturned end of said spring, after which the spring extends to the point where the pawl 7 is secured thereto. The normal tendency of the spring 9 is such that the pawl 7 is held projecting upwardly from the outer surface of the washer 3. The formation of the recesses or grooves 6 of the nut is such that the nut may be readily screwed in place on the bolt 2, and the pawl 7 will engage in one of the recesses or grooves 6 thereof by a ratchet action such as is common.

It will be apparent that the device is very simply constructed and may be cheaply made. The nut is effectively prevented from unscrewing, yet it is adapted to be displaced by slight pressure of the finger on the pawl 7 to force the latter down out of engagement with said nut.

Having thus described the invention, what is claimed as new is—

1. In a nut-lock, the combination of a bolt, a nut screwed thereon, a washer, projections extending from the inner side of the washer, said washer being provided with a slot extending from its peripheral portion, a pawl arranged in said slot projecting outwardly from the washer, and a curved spring attached at one end to the pawl and having its opposite end upturned and passing through an opening in the washer.

2. In a nut-lock, the combination of a bolt, a nut screwed thereon, a washer, projections extending from the inner side of the washer, said washer being provided with a slot extending from its peripheral portion, a pawl arranged in said slot projecting outwardly from the washer, and a curved spring attached at one end to the pawl and having its opposite end upturned and passing through an opening in the washer, the washer having extensions at its peripheral portion of which the aforesaid projections are integral portions, the curved spring aforesaid extending through a groove on the under side of one of the extensions above mentioned.

In testimony whereof we affix our signatures in presence of two witnesses.

AWULIUS J. GARRISON. [L. S.]
ARCH A. BOSSERMAN. [L. S.]

Witnesses:
HERBERT J. TAYLOR,
WM. H. AST.